(12) United States Patent
Phelps et al.

(10) Patent No.: US 11,339,727 B2
(45) Date of Patent: May 24, 2022

(54) GAS TURBINE ENGINE

(71) Applicant: ROLLS-ROYCE plc, London (GB)

(72) Inventors: Benedict R. Phelps, Derby (GB); Stephane M M Baralon, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/100,429

(22) Filed: Nov. 20, 2020

(65) Prior Publication Data

US 2021/0156317 A1 May 27, 2021

(30) Foreign Application Priority Data

Nov. 26, 2019 (GB) ...................................... 1917171

(51) Int. Cl.
*F02C 7/36* (2006.01)
*F02C 9/22* (2006.01)
*F01D 5/14* (2006.01)

(52) U.S. Cl.
CPC ................ *F02C 9/22* (2013.01); *F01D 5/146* (2013.01); *F02C 7/36* (2013.01); *F01D 5/142* (2013.01); *F05D 2220/323* (2013.01); *F05D 2240/60* (2013.01); *F05D 2260/70* (2013.01)

(58) Field of Classification Search
CPC .................................... F02K 3/06; F01D 5/142
See application file for complete search history.

(56) References Cited

U.S. PATENT DOCUMENTS

| | | | |
|---|---|---|---|
| 3,986,794 A * | 10/1976 | Korn | F02C 9/20 415/129 |
| 4,512,718 A | 4/1985 | Stargardter | |
| 6,145,300 A * | 11/2000 | Romani | F04D 29/324 60/226.1 |
| 7,765,786 B2 * | 8/2010 | Klingels | F04D 19/007 60/226.1 |

(Continued)

FOREIGN PATENT DOCUMENTS

| | | |
|---|---|---|
| EP | 3 067 566 A1 | 9/2016 |
| EP | 3361050 A1 | 8/2018 |

(Continued)

OTHER PUBLICATIONS

Mar. 24, 2021 extended Search Report issued in European Patent Application No. 20206443.2.

*Primary Examiner* — Justin D Seabe
(74) *Attorney, Agent, or Firm* — Oliff PLC

(57) ABSTRACT

Gas turbine aircraft engine comprising an engine core comprising a turbine, a compressor, a core shaft connecting the turbine to the compressor; and a fan upstream of the engine core and driven by the turbine, the fan comprising a circumferential row of tandem fan blades. Each fan blade comprises a main blade and an auxiliary blade. Over substantially all of the auxiliary blade's radial span, the leading edge of the auxiliary blade is rearwards of the closest point on the trailing edge of the main fan blade, and on a given aerofoil chordal section of the main fan blade, the leading edge position of an aerofoil chordal section of the auxiliary fan blade lies on a rearwards extension of the camber line of (Continued)

the aerofoil chordal section of the main fan blade, and the main fan blade and the auxiliary fan blade are arranged to rotate in tandem.

11 Claims, 5 Drawing Sheets

(56) References Cited

U.S. PATENT DOCUMENTS

| | | | |
|---|---|---|---|
| 7,901,185 B2* | 3/2011 | Suciu | F04D 29/323 |
| | | | 416/DIG. 5 |
| 2003/0099543 A1 | 5/2003 | Freeman et al. | |
| 2008/0025840 A1 | 1/2008 | Guemmer | |
| 2012/0244005 A1 | 9/2012 | Breeze-Stringfellow et al. | |
| 2014/0363276 A1 | 12/2014 | Vetters et al. | |
| 2016/0108735 A1 | 4/2016 | Forcier et al. | |
| 2016/0265430 A1 | 9/2016 | Schwarz | |
| 2017/0058677 A1 | 3/2017 | Rice | |
| 2018/0128284 A1 | 5/2018 | Wusatowska-Samek et al. | |
| 2018/0223735 A1 | 8/2018 | Kim | |

FOREIGN PATENT DOCUMENTS

| | | |
|---|---|---|
| FR | 3079007 A1 | 9/2019 |
| GB | 1 514 096 A | 6/1978 |
| GB | 2399602 A | 9/2004 |
| WO | 30/03136 A1 | 1/2000 |
| WO | 2015/175044 A2 | 11/2015 |

* cited by examiner

GAS TURBINE ENGINE

CROSS-REFERENCE TO RELATED APPLICATIONS

This specification is based upon and claims the benefit of priority from United Kingdom patent application number GB 1917171.9 filed on Nov. 26, 2019, the entire contents of which is incorporated herein by reference.

BACKGROUND

Field of the Disclosure

The present disclosure relates to a gas turbine engine, more specifically a gas turbine engine with tandem fan blades.

Description of the Related Art

Modern gas turbine engines typically comprise a fan positioned upstream of an engine core, having a circumferential row of fan blades mounted onto a fan hub. The fan is driven by a turbine in the engine core to generate an air flow. A radially outer portion of the generated air flow enters a bypass duct to provide propulsive thrust. The remainder of the air flow, towards the fan hub, flows through to the engine core to power a Brayton cycle, and to provide additional propulsive thrust.

In typical turbofan engines the fan is directly driven by a shaft that extends from a low pressure turbine (LPT) of the engine to the fan, and as such the fan rotates at the same rotational speed as the LPT. In some more recently developed turbofan engines, the fan and a low pressure compressor (LPC) of the engine core are both driven by the LPT, the LPC being directly driven by a shaft that extends from the LPT, and the fan being driven through a power gearbox that receives its drive from the shaft. Therefore the fan rotates at a lower speed than the LPT. Such an arrangement can improve the efficiency of the gas turbine engine because, for a given specific thrust, the fan tip loading increases as the fan reduces its rotational speed, leading to an improved bypass efficiency.

However, due to increased fan tip loading, the fan may be more susceptible to the self-excited vibration known as flutter. More specifically, when the fan blades in a row of blades vibrate, they generate unsteady aerodynamic forces. Under most conditions, these unsteady aerodynamic forces cause the blades to do work on the surrounding air, and the vibrations decay in amplitude. However, at certain operational conditions (for example certain rotational speeds and/or thrusts and/or combinations thereof), the surrounding air can do work on the fan itself. If the work done by the air exceeds the work dissipated (for example by mechanical damping), then the vibrations will grow. Such flutter is undesirable because it can generate large stresses in an engine. Flutter is discussed further in European patent application EP 3361050 A1.

One way to reduce the susceptibility of the fan blade to flutter is to decamber the hub and root of a fan blade, e.g. reduce the change in the angle of the camber line which on a given aerofoil chordal section extends between a leading edge and a trailing edge. Doing this can reduce the torsional component of the vibrational response in a first flap vibration mode, which can lead to improved flutter behaviour. However, such a reduced camber at the foot of the fan blade reduces the pressure ratio generated by the fan at the fan hub. That is, the ratio of the mean total pressure of the air flow into the engine core to the mean total pressure at the fan inlet is reduced. Also, combined with mechanical constraints, the combination of hub chord and camber may not be aerodynamically optimal. Consequently, the performance of the engine core and the overall efficiency or weight of the engine can be negatively affected.

Thus, it is desirable to provide a gas turbine engine with improved overall performance and efficiency, whilst lowering its susceptibility to flutter.

SUMMARY

The present disclosure provides a gas turbine engine for an aircraft, the gas turbine engine comprising:

an engine core comprising a turbine, a compressor, and a core shaft connecting the turbine to the compressor; and a fan located upstream of the engine core and driven by the turbine, the fan comprising a circumferential row of tandem fan blades;

wherein each of the tandem fan blades comprises a main fan blade and an auxiliary fan blade positioned at the rear of the main fan blade, such that, over substantially all of the auxiliary fan blade's radial span, the leading edge of the auxiliary fan blade is rearwards of the closest point on the trailing edge of the main fan blade, and on a given aerofoil chordal section of the main fan blade, the leading edge position of an aerofoil chordal section of the auxiliary fan blade lies on a rearwards extension of the camber line of the aerofoil chordal section of the main fan blade, and the main fan blade and the auxiliary fan blade are arranged to rotate in tandem; and wherein the auxiliary fan blade is movable within a range of pitch angles relative to the main fan blade.

As the leading edge of the auxiliary fan blade is rearwards of the closest point on the trailing edge of the main fan blade, the auxiliary fan blade does not have a significant detrimental aerodynamic effect upon the air flow across the main fan blade. Moreover, since the leading edge position of an aerofoil chordal section of the auxiliary fan blade lies on an extension of the camber line of an aerofoil chordal section of the main fan blade, and since the main and auxiliary fan blades are arranged to rotate in tandem (i.e. at the same rotational speed), each auxiliary fan blade can advantageously serve as an extension of its respective main fan blade, with air flow leaving the main fan blade following a smooth flow path towards the auxiliary fan blade. This can allow greater design freedom of the main fan blade. In particular a shallower camber line (i.e. reduced camber) can be implemented towards the foot of the main fan blade to reduce susceptibility to flutter by reducing the torsional component of the vibrational response in the first flap vibration mode, while the associated drop in fan root pressure ratio can be at least partially mitigated by the auxiliary fan blade. For example, the inclusion of the auxiliary fan blade can effectively extend a camber line of the main fan blade, which in turn can result in an increase in their combined overall camber angle, and a corresponding boost in the fan hub pressure ratio.

On any given aerofoil section, the camber line extends from the leading edge position to the trailing edge position of the section. Along circumferential directions in the plane of the aerofoil section, the camber line is equally spaced from the pressure and suction surfaces of the aerofoil. In this application throughout, the phrase "overall camber angle"

refers to the combined camber angle of a pair of main fan blade and auxiliary fan blade aerofoil chordal sections, the chordal sections being paired when the leading edge position of an auxiliary fan blade aerofoil chordal section lies on a rearwards extension of the camber line of a main fan blade aerofoil chordal section. That is, the overall camber angle is the angle between the direction of the camber line at the leading edge position of a main fan blade aerofoil chordal section and the direction of the camber line at the trailing edge position of its paired auxiliary fan blade aerofoil chordal section.

The present disclosure also provides a fan of the aforementioned gas turbine engine. For example, the fan may comprise a circumferential row of tandem fan blades, wherein each of the tandem fan blades comprises a main fan blade and an auxiliary fan blade positioned at the rear of the main fan blade, such that, on a given aerofoil chordal section of the main fan blade, the leading edge position of an aerofoil chordal section of the auxiliary fan blade lies on a rearwards extension of the camber line of the aerofoil chordal section of the main fan blade, and wherein the main fan blade and the auxiliary fan blade are arranged to rotate in tandem.

The present disclosure also provides a tandem fan blade of the aforementioned gas turbine engine. For example, the tandem fan blade may comprise a main fan blade and an auxiliary fan blade positioned at the rear of the main fan blade, such that, on a given aerofoil chordal section of the main fan blade, the leading edge position of an aerofoil chordal section of the auxiliary fan blade lies on a rearwards extension of the camber line of the aerofoil chordal section of the main fan blade, and wherein the main fan blade and the auxiliary fan blade are arranged to rotate in tandem.

Optional features of the present disclosure will now be set out. These are applicable singly or in any combination with any aspect of the present disclosure.

The auxiliary fan blade may be positioned such that, over substantially all of its radial span, the leading edge positions of the aerofoil chordal sections of the auxiliary fan blade lie on rearwards extensions of the camber lines of respective aerofoil chordal sections of the main fan blade. For example, the auxiliary fan blade may be positioned such that, over at least 90%, 95% or 100% of its radial span, the leading edge positions of the aerofoil chordal sections of the auxiliary fan blade lie on extensions of the camber lines of respective aerofoil chordal sections of the main fan blade.

The gas turbine engine may further comprise an annular splitter behind the fan and configured to split an air flow generated by the fan into a core airflow that flows through the engine core and a bypass airflow that flows through a bypass duct surrounding the engine core, wherein the auxiliary fan blades have radially outer tips which are inside or level with the radial position of the annular splitter. In such a way, the auxiliary fan blades can sweep across just the entrance to the engine core, and thus may act on the core flow without interfering with the bypass flow.

In side elevational view, the projected area of the auxiliary fan blade of each tandem fan blade may be less than the projected area of the respective main fan blade. For example, the projected area of the auxiliary fan blade of each tandem fan blade may be less than 25%, and preferably less than 20%, 15%, 10%, 5% or 3%, of the projected area of the respective main fan blade.

The main fan blade and the auxiliary fan blade may be configured so that, in side elevational view, the trailing edge of the main fan blade has the appearance of a cut-out region at the rear of the base of the main fan blade, which cut-out region embraces the auxiliary fan blade. More specially, the main fan blade radially outward of the auxiliary blade may extend over the tip of the auxiliary fan blade. This may allow the trailing edge of the main fan blade radially outward of the auxiliary blade to form an extension of the line of the trailing edge of the auxiliary fan blade, thereby reducing unwanted flow disturbances at the tip of the auxiliary blade.

Thus, in side elevational view, the cut-out region of the main fan blade may completely embrace the leading edge and tip of the auxiliary fan blade, such that the overall axial extent of the tandem fan blade, and hence the axial extent of a fan rotor disc for carrying the tandem fan blades, may be the same as that of a fan having corresponding mono fan blades. This may facilitate retrofitting of the tandem fan blades and their corresponding fan rotor disc to existing gas turbine engines, as well as reducing the amount of engine redesign that may be required to accommodate the tandem fan blades.

The auxiliary fan blade is movable within a range of pitch angles relative to the main fan blade. For example, the auxiliary fan blade may be rotatable, or pivotable, about its leading edge, e.g. by a gear-based variable pitch mechanism. The variable pitch mechanism may be provided on the fan rotor disc. The variable pitch mechanism may be configured to simultaneously vary the pitch angles of all of the auxiliary fan blades mounted on the fan rotor disc. Advantageously, a change in the pitch angle of the auxiliary fan blade changes combined camber lines towards the foot of the tandem fan blade, and thereby changes overall camber angles thereat. Therefore, the fan hub pressure ratio may be controlled by varying the pitch angle of the auxiliary fan blade. This is particular beneficial because the fan hub pressure ratio of the turbine engine may be selectively varied depending on the flight condition, e.g. take-off and cruise condition.

The auxiliary fan blade may be movable within a range of pitch angles of at least 10°, and preferably of at least 20°, whereby increasing the pitch angle increases the overall camber angle of the given aerofoil chordal sections of the main fan blade and the auxiliary fan blade by a corresponding amount. For example, during aircraft take-off when the gas turbine engine provides the maximum amount of thrust during a flight, the auxiliary fan blade may be moved to a pitch angle of 0° to reduce overall camber angles. Conversely, during aircraft cruise, the auxiliary fan blade may be moved to a greater pitch angle (e.g. to at least 10°) to increase the overall camber angle and hence increase the fan hub pressure ratio. For example, at cruise operating condition the fan hub pressure ratio may increase from 1.2 to 1.3, or in excess of 1.3.

The auxiliary fan blade may be configured to contribute at least 20% of the total work done by the tandem fan blade at cruise operating condition of the engine. Here and in the following, by "total work done" we mean $C_p \cdot \Delta TAT$, where $C_p$ is the specific heat at constant pressure, and $\Delta TAT$ is the rise in total air temperature.

The auxiliary fan blade may be configured such that moving the auxiliary fan blades across the total range of pitch angles varies the total work done by the fan by at least 20%.

Another option, however, is for the pitch angle of the auxiliary fan blade to be fixed, i.e. non-adjustable. This may reduce the complexity of the fan and the associated control, and may reduce the overall weight of the fan. A fixed pitch angle auxiliary fan blade may provide an overall camber angle of about 10° at the foot of the tandem fan blade. This may optimise the fan hub pressure ratio for cruise operating condition.

The fan may further comprise a fan rotor disc to which the circumferential row of tandem fan blades is attached, wherein each auxiliary fan blade has a root portion which engages with a complimentary formation formed in the fan rotor disc to removably mount the auxiliary fan blade to the fan rotor disc. Such a mounting arrangement may be particularly convenient when the pitch angle of the auxiliary fan blade is fixed. For example, the root portion may be a dovetail and the complimentary formation a matching recess into which the dovetail can be slid. Typically the main fan blade has a similar mounting arrangement to the rotor disc.

The main fan blade and the auxiliary fan blade of each of the tandem fan blades may be independently removed for upgrade or inspection and maintenance. In particular, just the auxiliary fan blades can be replaced by ones with a different configuration so as to achieve e.g. a different overall camber angle.

The main fan blade may have a radial span extending from a hub at a 0% span position to a tip at a 100% span position, wherein the average camber angle of the radially innermost 10% of the radial span of the main fan blade is less than 75% of the average camber angle of the 10% portion of the radial span of the main fan blade that has the maximum average camber angle. Such a configuration may be known as decambering. Advantageously, decambering of the hub portion of the blade may reduce susceptibility to flutter of the main fan blade.

The leading edge of the auxiliary fan blade may adjoin the trailing edge of the main fan blade. Advantageously, this may reduce turbulence at the transition between the main fan blade and the auxiliary fan blade. Alternatively, the leading edge of the auxiliary fan blade may be spaced from the trailing edge of the main fan blade, i.e. to provide a small clearance between the auxiliary fan blade and main fan blade. Advantageously, this may reduce the likelihood of interference between the main fan blade and the auxiliary fan blade when the latter changes pitch angle. The clearance may provide a gap between the leading edge of the auxiliary fan blade and the trailing edge of the main fan blade which, measured in the axial direction of the engine, has a width which is no more than 10%, and preferably no more than 5%, of the maximum axial spacing between the leading and trailing edges of the main fan blade. In this way, air flow leaving the trailing edge of the main fan blade can flow efficiently and uninterruptedly to the leading edge of the auxiliary fan blade, i.e. typically there is no need for static components (such as stator vanes) in the gap between the main fan blade and the auxiliary fan blade.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core connected to a LPT by a shaft, or a LPT/IPT by a gearing mechanism.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each main fan blade may be defined as having a radial span extending from a root (or hub) at a radially inner gas-washed location, or 0% span position, to a tip at a 100% span position. The ratio of the radius of the main fan blade at the hub to the radius of the main fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the main fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a main fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm.

Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade, e.g. the tandem fan blade, and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the tandem fan blades may extend, for example in a radial direction. The tandem fan blades may be attached to the central portion in any desired manner. For example, each tandem fan blade, e.g. the main fan blade and the auxiliary fan blade, may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the tandem fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of tandem fan blades, for example 16, 18, 20, or 22 tandem fan blades each comprising a main fan blade and an auxiliary fan blade.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
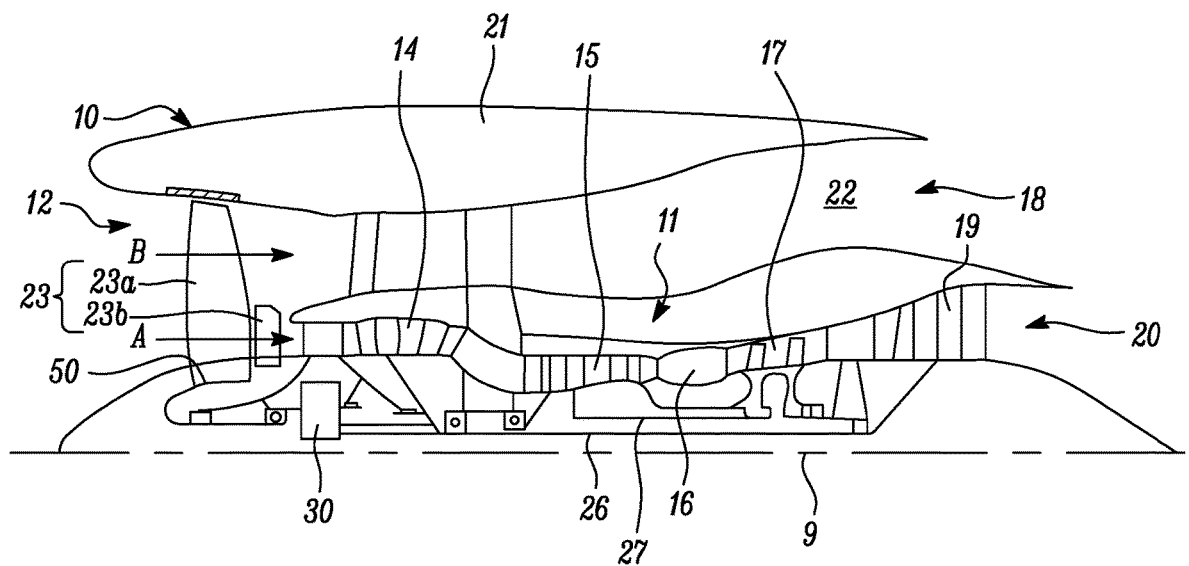
FIG. 1 is a sectional side view of a gas turbine engine.

FIG. 1 illustrates a gas turbine engine 10 having a principal rotational axis 9. The engine 10 comprises an air intake 12 and a propulsive fan having a circumferential row of tandem fan blades 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan blades 23 generally provide the majority of the propulsive thrust. The epicyclic gearbox 30 is a reduction gearbox.

Figure 2:
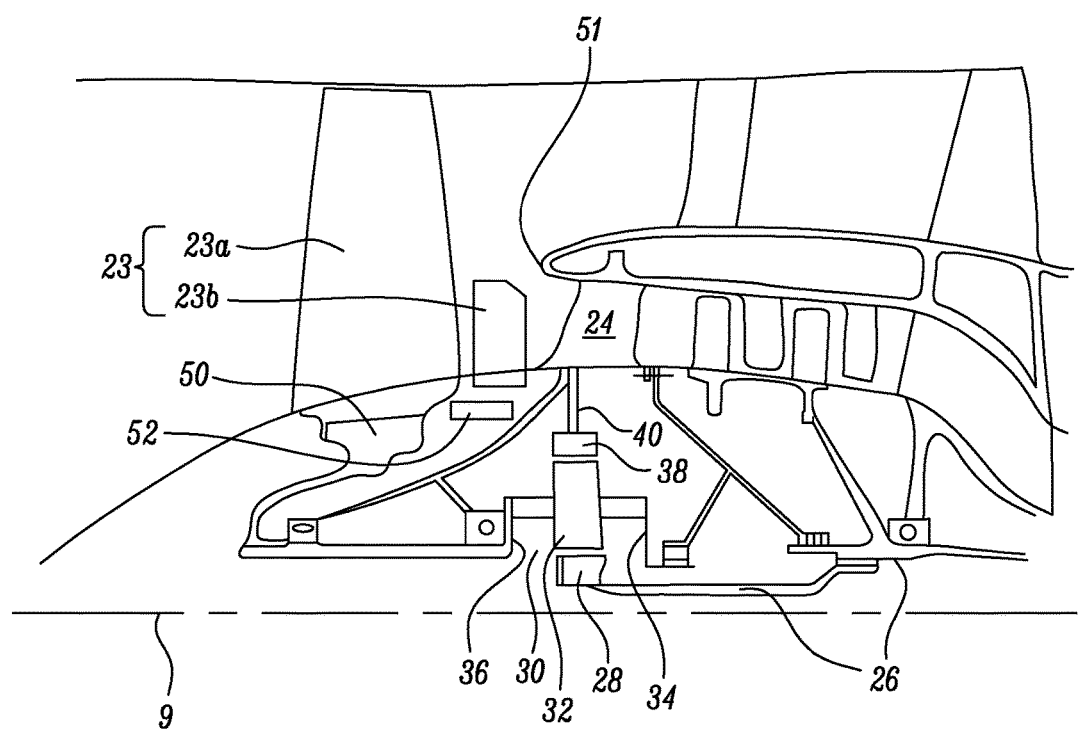
FIG. 2 is a close up sectional side view of an upstream portion of a gas turbine engine of FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan) respectively and/or the turbine and compressor stages that are connected together by the interconnecting shaft 26 with the lowest rotational speed in the engine (i.e. not including the gearbox output shaft that drives the fan). In some literature, the "low pressure turbine" and "low pressure compressor" referred to herein may alternatively be known as the "intermediate pressure turbine" and "intermediate pressure compressor". Where such alternative nomenclature is used, the fan may be referred to as a first, or lowest pressure, compression stage.

Figure 3:
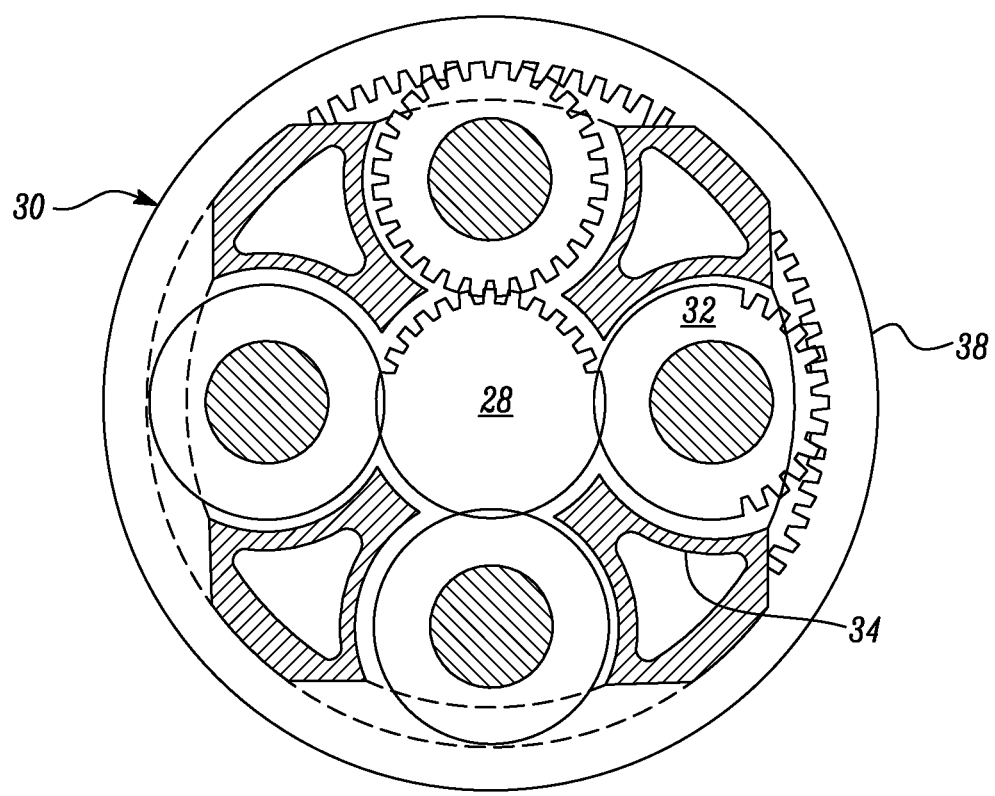
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fan, as shown in FIGS. 1 and 2, comprises a plurality of tandem fan blades 23 attached to a fan rotor disc of a fan hub 50, and arranged in a circumferential row around the fan hub 50. Each of the tandem fan blades comprises a main fan blade 23a and an auxiliary fan blade 23b positioned rearwards of the main fan blades 23a, such that on a given aerofoil chordal section of the main fan blade, the leading edge position of an aerofoil chordal section of the auxiliary fan blade 23b lies on a rearwards extension of the camber line of the aerofoil chordal section of the main fan blade 23a. Moreover, the main fan blade 23a and the auxiliary fan blade 23b in each of the tandem fan blades 23 are arranged to rotate in tandem so that they retain their angular positions relative to each other.

Each auxiliary fan blade 23*b* is pivotable about its leading edge, such that it is movable within a range of pitch angles relative to the main fan blade 23*a*. The pivoting movement of the auxiliary fan blade is actuated by a gear-based variable pitch mechanism 52 provided in the fan hub 50.

Figure 4:
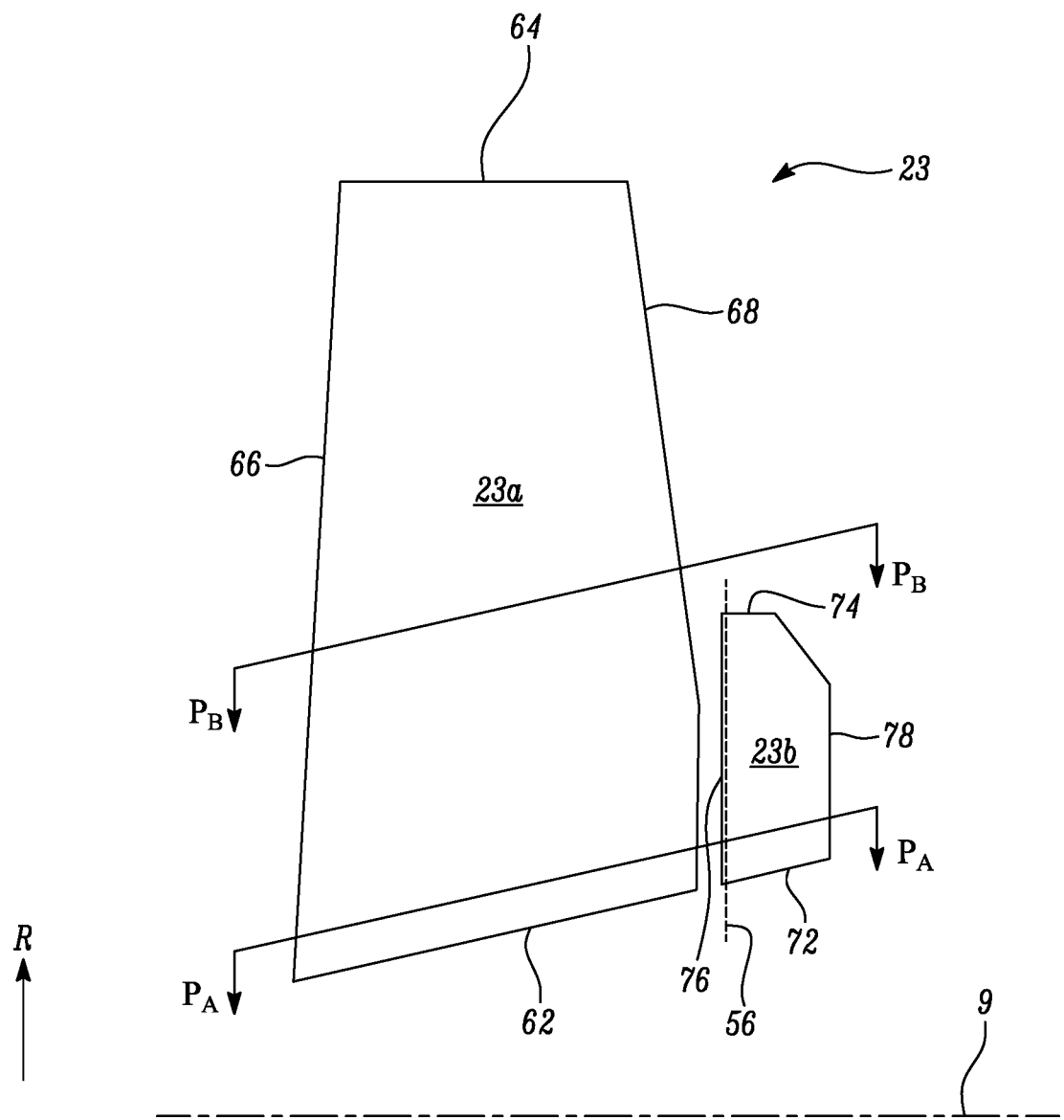
FIG. 4 is a schematic side elevational view of a tandem fan blade for use with the gas turbine engine of FIGS. 1 and 2.

FIG. 4 shows a schematic side elevational view of the tandem fan blade 23 with respect to the principal rotational axis 9. In this view, the main fan blade 23*a* projects a larger area than the auxiliary fan blade 23*b*. The main fan blade 23*a* also has a greater span in the radial direction R of the engine than the auxiliary fan blade 23*b*. Specifically, the main fan blade 23*a* extends from a hub 62 to a tip 64 adjacent the inner surface of the nacelle 21, while the auxiliary fan blade 23*b* extends from a hub 72 to a tip 74 which is at or inwards of the radial position of the leading edge of an annular splitter 51 located behind the fan, the splitter splitting the air flow generated by the fan into the core airflow A the bypass airflow B. Thus the auxiliary fan blades 23*b* have little or no effect on the bypass airflow B.

The main fan blade 23*a* and the auxiliary fan blade 23*b* have respective leading edges 66, 76 and trailing edges 68, 78. The main fan blade 23*a* has a root portion, such as a dovetail (not shown), which engages with a complimentary formation formed in the fan rotor disc to removably mount the blade to the disc.

As mentioned above, the auxiliary fan blade 23*b* is pivotable about its leading edge 76 by the variable pitch mechanism 52. More specifically, the auxiliary fan blade 23*b* is pivotable about rotational axis 56, shown as a dotted line in FIG. 4. There is a small clearance between the trailing edge 68 of the main fan blade 23*a* and the leading edge 76 of the auxiliary fan blade 23*b*. This ensures the leading edge 76 of the auxiliary fan blade 23*b* does not interfere with the trailing edge 68 of the main fan blade 23*a* when the auxiliary fan blade pivots. The clearance may provide a gap between the leading edge of the auxiliary fan blade and the trailing edge of the main fan blade which, measured in the axial direction of the engine, has a width which is no more than 10%, and preferably no more than 5%, of the maximum axial spacing between the leading and trailing edges of the main fan blade.

Figure 5A:
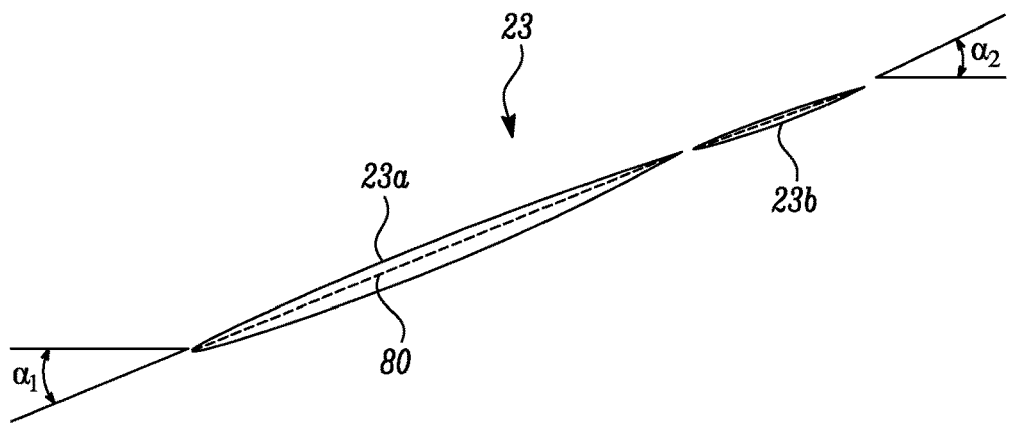
FIG. 5A is a schematic chordal section of the tandem fan blade of FIG. 4 on line $P_A$-$P_A$ in a first configuration.
Figure 5B:
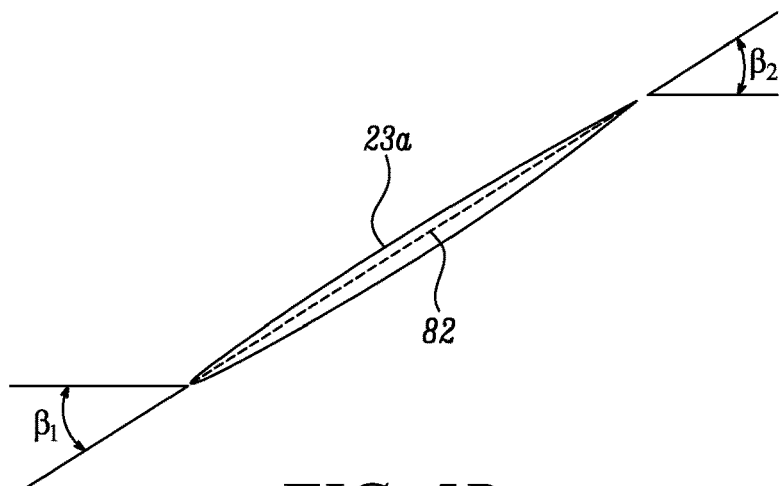
FIG. 5B is a schematic chordal section of the tandem fan blade of FIG. 4 on line $P_B$-$P_B$.

Schematic aerofoil chordal sections of the tandem fan blade 23 of FIG. 4 on line $P_A$-$P_A$ are shown in FIG. 5A. The line $P_A$-$P_A$ is within the first 10% of the span of the main fan blade 23*a* as measured from its hub 62. In contrast, a schematic aerofoil chordal section of the main fan blade 23*a* of FIG. 4 on line $P_B$-$P_B$ is shown in FIG. 5B. The line $P_B$-$P_B$ is within the first 40% of the span of the main fan blade 23*a* as measured from its hub 62, but is above the tip 74 of the auxiliary fan blade 23*b* and hence no aerofoil chordal section for the auxiliary fan blade is displayed in FIG. 5B.

A combined camber line 80 of the tandem fan blade 23 on line $P_A$-$P_A$ is shown in FIG. 5A, and a camber line 82 of just the main fan blade 23*a* on line $P_B$-$P_B$ is shown in FIG. 5B. The combined camber line 80 is a combination of the camber lines of the main fan blade 23*a* and the auxiliary fan blade 23*b* on line $P_A$-$P_A$. More specifically, in FIG. 5A the camber line of the aerofoil chordal section of the auxiliary fan blade 23*b* is a rearwards continuation of the camber line of the aerofoil chordal section of the main fan blade 23*a*. As such the air flow over the main fan blade 23*a* continues with little disturbance over the auxiliary fan blade 23*b*. A combined camber line of the type shown in FIG. 5A, i.e. such that the leading edge position of the aerofoil chordal section of the auxiliary fan blade 23*b* lies on a rearwards extension of the camber line of the aerofoil chordal section of the main fan blade 23*a*, is provided over substantially the entire radial span of the auxiliary fan blade 23*b*.

In FIG. 5A the angle between the direction of the combined camber line 80 at the leading edge position of the main fan blade aerofoil chordal section and the axial direction is $\alpha_1$, and the angle between the direction of the combined camber line at the trailing edge position of the auxiliary fan blade aerofoil chordal section and the axial direction is $\alpha_2$. The overall camber angle of the aerofoil chordal sections, therefore, is ($\alpha_1-\alpha_2$).

In FIG. 5B the angle between the direction of the camber line 82 at the leading edge position of the main fan blade aerofoil chordal section and the axial direction is $\beta_1$, and the angle between the direction of the camber line at the trailing edge position of the main fan blade aerofoil chordal section and the axial direction is $\beta_2$. Thus, the camber angle is ($\beta_1-\beta_2$).

The main fan blade 23*a* as shown in FIGS. 5A and 5B is a decambered fan blade. For example, the average camber angle of the radially innermost 10% of the radial span of the main fan blade is less than 75% of the average camber angle of the 10% portion of the radial span of the main fan blade that has the maximum average camber angle. The fan hub pressure ratio at the foot of the main fan blade may thus be less than 1.2.

During aircraft take-off, the gas turbine engine provides the maximum amount of thrust during a flight. This is an operating condition which is typically limited by the T30 delivery temperature of the high-pressure compressor 15 to the combustor 16. Therefore it is desirable to limit the fan hub pressure ratio in order to reduce this contribution to the T30 temperature. For example, as illustrated in FIG. 5A, the auxiliary fan blade 23*b* can be pivoted to its lowest pitch angle, which results in a low overall camber angle ($\alpha_1-\alpha_2$). As a result, the auxiliary fan blade 23*b* does not significantly increase the fan hub pressure ratio.

Figure 6:
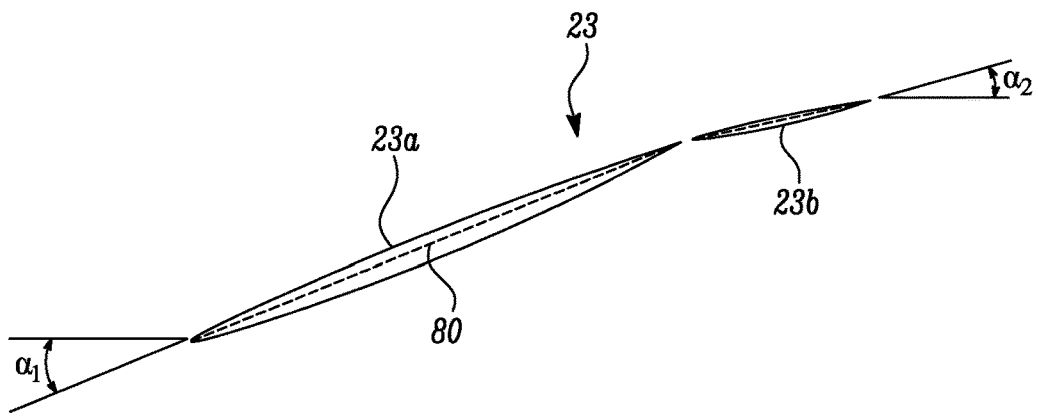
FIG. 6 is a schematic chordal section of the tandem fan blade of FIG. 4 on line $P_A$-$P_A$ in a second configuration.

However, during e.g. cruise operating condition, which is not limited by the T30 delivery temperature, the auxiliary fan blade 23*b* can be pivoted to a pitch angle which results in a higher overall camber angle ($\alpha_1-\alpha_2$), as shown in FIG. 6 which are the same schematic chordal sections as FIG. 5A but with the auxiliary fan blade 23*b* pivoted about its leading edge 76. In this way, the auxiliary fan blade 23*b* supplements the flow turning capability at the foot of the main fan blade 23*a*, and thereby increases the fan hub pressure ratio from 1.2 to 1.3 or more. This leads to an increase in T30 temperature and overall pressure ratio, and accordingly improves the efficiency of the gas turbine engine. The auxiliary fan blades 23*b* can be configured to contribute at least 20% of the total work done by the tandem fan blades 23 at cruise operating condition of the engine. Calculations suggest that use of the auxiliary fan blades during cruise can lead to about a 20° C. increase in T30 temperature and a significant improvement in specific fuel consumption (SFC)

Typically, the auxiliary fan blade 23*b* can be pivoted through a range of pitch angles of about 15°, with a pitch angle of 0° corresponding to the lowest overall camber angle (e.g. ($\alpha_1-\alpha_2$) of about 10°) and a pitch angle of 15° corresponding to the highest overall camber angle (e.g. ($\alpha_1-\alpha_2$) of about 25°). At a pitch angle of 15° the auxiliary fan blade 23*b* essentially acts as a booster for the low pressure compressor 14. Moving the auxiliary fan blades across the total range of pitch angles can vary the work done by the fan by about 20%.

In a variant tandem fan blade (not shown), the pitch angle of the auxiliary fan blade is fixed, e.g. non-adjustable. In this variant tandem fan blade, the pitch angle of the auxiliary fan blade can be set to provide an overall camber angle which balances the desire for an increased fan foot pressure ratio at cruise operating condition with a suitably limited T30 temperature at take-off. As the variant fan blade does not require a variable pitch mechanism, it can help to reduce the overall weight of the fan.

Figure 7:
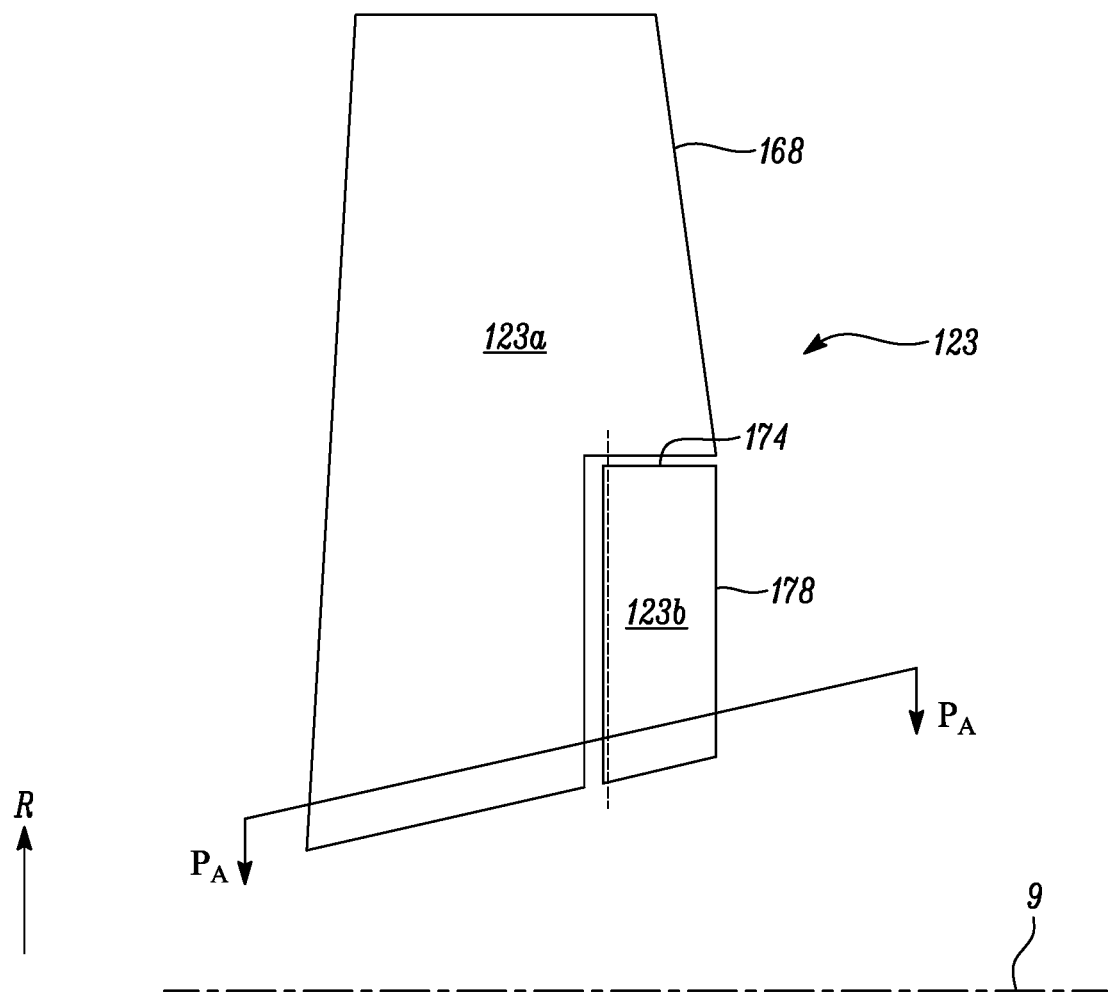
FIG. 7 is a schematic side elevational view of a variant tandem fan blade.

FIG. 7 shows a schematic side elevational view of a variant tandem fan blade 123, comprising a main fan blade 123*a* and an auxiliary fan blade 123*b*. In this view, the trailing edge of the main fan blade 123*a* has the appearance of a cut-out region at the rear of the base of the main fan blade 123*a*, which cut-out region embraces the auxiliary fan blade. For example, the cut-out region is sized so that the trailing edge 168 of the main fan blade radially outward of the auxiliary blade forms an extension of the line of the trailing edge 178 of the auxiliary fan blade. This can help to reduce unwanted flow disturbances at the tip 174 of the auxiliary blade. In the side elevational view, the tandem fan blade 123 exhibits a similar profile as a decambered mono fan blade.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, the gas turbine engine comprising: an engine core including a turbine, a compressor, and a core shaft connecting the turbine to the compressor; and a fan located upstream of the engine core and driven by the turbine, the fan including a circumferential row of tandem fan blades, each of the tandem fan blades including a main fan blade and an auxiliary fan blade positioned at the rear of the main fan blade, wherein for each of the tandem fan blades; a leading edge of the auxiliary fan blade is rearwards of a closest point on a trailing edge of the main fan blade over all of a radial span of the auxiliary fan blade, on each aerofoil chordal section of the main fan blade, a leading edge position of an aerofoil chordal section of the respective auxiliary fan blade lies on a rearwards extension of a camber line of the aerofoil chordal section of the main fan blade, the main fan blade and the auxiliary fan blade are arranged to rotate in tandem, and the auxiliary fan blade is movable within a range of pitch angles to pivot about the leading edge of the auxiliary fan blade.

2. The gas turbine engine of claim 1, wherein over all of the radial span of the auxiliary fan blade, the auxiliary fan blade is positioned such that the leading edge of each aerofoil chordal section of the auxiliary fan blade lies on the rearwards extension of the camber line of a respective aerofoil chordal section of the main fan blade.

3. The gas turbine engine of claim 1, wherein over all of the radial span of the auxiliary fan blade, the auxiliary fan blade is positioned such that the leading edge of the auxiliary fan blade is rearwards of the closest part of the trailing edge of the main fan blade.

4. The gas turbine engine of claim 1, further comprising an annular splitter positioned behind the fan, the annual splitter being configured to split an air flow generated by the fan into a core airflow that flows through the engine core and a bypass airflow that flows through a bypass duct surrounding the engine core, wherein the auxiliary fan blades respectively have radially outer tips which are equal to or less than a radial position of the annular splitter in a radial direction of the auxiliary fan blades.

5. The gas turbine engine of claim 1, wherein, in side elevational view, a projected area of the auxiliary fan blade of each tandem fan blade is less than a projected area of the respective main fan blade.

6. The gas turbine engine of claim 1, wherein the auxiliary fan blade is movable within a range of pitch angles of at least 10°, and increasing the pitch angle increases the overall camber angle of a given aerofoil chordal section defined by the main fan blade and the auxiliary fan blade by a corresponding amount.

7. The gas turbine engine of claim 1, wherein during an aircraft take-off, the auxiliary fan blades are configured to pivot to a pitch angle in a range of 0°-5°.

8. The gas turbine engine of claim 1, wherein during an aircraft cruising operation, the auxiliary fan blades are configured to pivot to a pitch angle of 10°-15°.

9. The gas turbine engine of claim 1, wherein:
each main fan blade has a radial span extending from a hub at a 0% span position to a tip at a 100% span position, and
a lower average camber angle of each main fan blade is defined by an average camber angle of a portion of a radial span of each main fan blade between 0% and 10%, and
the lower average camber angle of each main fan blade is less than 75% of the lower average camber angle of a main fan blade that has a maximum average camber angle.

10. The gas turbine engine of claim 1, further comprising:
a gearbox that receives an input from the core shaft and outputs drive to the fan to drive the fan at a lower rotational speed than the core shaft.

11. A gas turbine engine for an aircraft, the gas turbine engine comprising:
an engine core including a turbine, a compressor, and a core shaft connecting the turbine to the compressor; and
a fan located upstream of the engine core and driven by the turbine, the fan including a circumferential row of tandem fan blades, each of the tandem fan blades including a main fan blade and an auxiliary fan blade positioned at the rear of the main fan blade, wherein for each of the tandem fan blades:
a leading edge of the auxiliary fan blade is rearwards of a closest point on a trailing edge of the main fan blade over all of the a radial span of the auxiliary fan blade,
on each aerofoil chordal section of the main fan blade, a leading edge position of an aerofoil chordal section of the corresponding auxiliary fan blade lies on a rearwards extension of a camber line of the aerofoil chordal section of the main fan blade,
the main fan blade and the auxiliary fan blade are arranged to rotate in tandem,
the auxiliary fan blade is movable within a range of pitch angles relative to the main fan blade, and
the main fan blade and the auxiliary fan blade are configured so that, in side elevational view, the trailing edge of the main fan blade has a cut-out region at a rear of a base of the main fan and the cut-out region embraces the auxiliary fan blade.

* * * * *